(12) United States Patent
Boillot (10) Patent No.: US 8,312,479 B2
(45) Date of Patent: Nov. 13, 2012

(54) APPLICATION PROGRAMMING INTERFACE (API) FOR SENSORY EVENTS

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 1149 days.

(21) Appl. No.: 11/683,412

(22) Filed: Mar. 7, 2007

(65) Prior Publication Data
US 2007/0214462 A1   Sep. 13, 2007

Related U.S. Application Data

(60) Provisional application No. 60/779,919, filed on Mar. 8, 2006.

(51) Int. Cl.
| G06K 9/00 | (2006.01) |
| G06K 9/62 | (2006.01) |
| G06K 9/34 | (2006.01) |
| G06K 9/36 | (2006.01) |
| G06K 9/38 | (2006.01) |
| G06K 9/18 | (2006.01) |
| G06K 9/46 | (2006.01) |
| G06K 9/66 | (2006.01) |
| G06K 9/48 | (2006.01) |
| G06K 9/56 | (2006.01) |
| G06K 9/76 | (2006.01) |
| G06K 9/74 | (2006.01) |
| G06K 9/64 | (2006.01) |
| G06K 9/68 | (2006.01) |
| G06K 9/70 | (2006.01) |
| G06K 9/44 | (2006.01) |
| G06K 9/32 | (2006.01) |
| G06K 9/54 | (2006.01) |
| G06K 9/60 | (2006.01) |
| G06K 9/03 | (2006.01) |
| G06K 7/00 | (2006.01) |

(52) U.S. Cl. ........ 719/328; 382/340; 382/345; 382/367; 382/369; 382/375; 345/173; 345/156; 345/157; 345/158; 345/160; 715/701; 715/702; 710/8

(58) Field of Classification Search .................. None
See application file for complete search history.

(56) References Cited

U.S. PATENT DOCUMENTS

| 5,168,531 | A * | 12/1992 | Sigel ............... 382/291 |
| 5,274,363 | A | 12/1993 | Koved |
| 6,130,663 | A | 10/2000 | Null |
| 6,137,427 | A | 10/2000 | Binstead |
| 6,313,825 | B1 * | 11/2001 | Gilbert ............ 345/156 |
| 6,937,227 | B2 | 8/2005 | Qamhiyah |
| 7,078,911 | B2 | 7/2006 | Cehelnik |
| 7,081,884 | B2 | 7/2006 | Kong |
| 7,092,109 | B2 | 8/2006 | Satoh |
| 7,130,754 | B2 | 10/2006 | Satoh |
| 2006/0092022 | A1 | 5/2006 | Cehelnik |
| 2006/0161871 | A1 | 7/2006 | Hotelling |
| 2006/0256090 | A1 | 11/2006 | Huppi |

* cited by examiner

Primary Examiner — Andy Ho
Assistant Examiner — Craig Dorais (57) ABSTRACT

An Applications Programming Interface (API) provides coordinate and movement information of an object within a sensory field. The API can provide touchless APT methods for identifying a position, a displacement, a velocity, an acceleration, and a length of time an object is within a sensory field. The API can include an event listener for receiving at least one sensory event, and an event handler for processing sensory events. A GUI can implement the API to provide touchless navigation and control.

18 Claims, 2 Drawing Sheets

APPLICATION PROGRAMMING INTERFACE (API) FOR SENSORY EVENTS

CROSS-REFERENCE TO RELATED APPLICATIONS

This application claims the priority benefit of U.S. Provisional Patent Application No. 60/779,919 entitled "API for Sensory Detection" filed Mar. 8, 2006, the entire contents of which are hereby incorporated by reference.

This application also incorporates by reference the following Applications: "Method and Device for Three-Dimensional Sensing" which is U.S. patent application Ser. No. 11/683,410, "Visual Toolkit for a Virtual User Interface" which is U.S. patent application Ser. No. 11/683,413, "Virtual User Interface Method and Device Thereof" which is U.S. patent application Ser. No. 11/683,415, and "Touchless Tablet Method and Device Thereof" which is U.S. patent application Ser. No. 11/683,416 all filed on the same day as this Application.

FIELD

The present embodiments of the invention generally relates to the field of application program interfaces, more particularly to input device interfaces.

BACKGROUND

High level languages such as object oriented programming languages allow developers to rapidly build and test code. An Applications Programming Interface is a common component of object oriented programming languages which allows developers to build software for a particular application through a reference program library. The reference program library can be linked to hardware for performing specific tasks or functions. In C and other procedural programming languages, the programming is action oriented. For example, C programs are written as functions. An object oriented programming language such as C++ provides abstraction and provides for the creation of classes. Key components of object oriented programming are inheritance, polymorphism, and abstraction. These features provide code reusability, reduced code complexity, easier interpretation, and better visualization. Object oriented programming provides for data variables, or members, that can be contained in classes. C++ for example, contains a set of foundation classes for providing access to programming methods and functions. Java is another object oriented programming languages that focuses on classes and methods for programming. The classes can be used to instantiate other classes that can in turn employ the functionality and behavior of the inherited class methods and variables.

Developers can build new classes or extend existing classes to add new features or functionality. Many class libraries exist which provides for well-defined, carefully tested, well documented, and portable components. The kind of flexibility afforded by the use of standard class libraries speeds up development and testing. Class libraries can be packaged and provided as a single distribution. Applications Programming Interfaces (API) are library modules for enhancing capabilities or extending functionality. An API can open up resources that may be unavailable to a developer or may require a developer to write underlying device drivers. Device drivers convert information in one format on one hardware into a format that is interpretable on another platform. Device drivers are common software for hardware devices such as cameras, printers, copiers, DVD drives, and multimedia components that interface to a computer system. Device drivers may be proprietary solutions that provide operational utility through an API. The API opens up communication to the device, thereby providing developers access to the underlying resources offered by the device. An API provides a developer a common access point through a programming language to communicate with the underlying platform or to provide access to proprietary features.

An input device such as a mouse, a stick, a touchpad, a tablet may have API's that allow developers to tap access the functionality provided by the input device. An input device can convert physical movement to coordinate information. For example, a mouse converts physical movement of a mouse to a coordinate. A touchpad converts physical touch to a coordinate. A stick is similar to a joystick which converts physical movement to a coordinate. A tablet converts a physical action such as the depressing of a stylus on a tablet to a coordinate. These input devices operate on some form of physical input. Each input device may provide various information that is specific to the device. An API can precipitate access to the various information in the form of parameters, variables, or methods that can be utilized by a developer. For example, a touchpad may provide an API providing information as to the touching of the touchpad, or the stiction associated with the touchpad. Each input device may have its own API particularly suited for opening up access to underlying methods, classes, variables, or functions of the input device hardware.

An API is not generally available to proprietary input devices or hardware that interfaces to only one component or system. An API can be developed when a hardware manufacturer or supplier, for example, desires to open up access to the hardware, thereby allowing outside companies or manufacturers to employ their proprietary device in their product offering. The API provides access to the underlying functionality without revealing the internal proprietary details of operation.

SUMMARY

A motion sensing device is a device that detects movement without touch; that is, it is not physical. A motion sensing device can used for generating coordinate information without physical touch. However, a motion sensing device does not generally interface to a computer system and the coordinate information is generally proprietary to the motion sensing device. A need therefore exist for API which opens access to a hardware device such as motion sensing device.

Embodiments of the invention concern an Applications Programming Interface (API) for providing sensory detection information. The API can include a set of touchless API methods for two-dimensional and three-dimensional sensing. The set of touchless API methods conveys coordinates and movements of an object detected within a sensory field to an application. The set of touchless API methods can constitute a base class which can further include a set of instance variables serving as the data components of the base class. The set of touchless API methods can provide a position, a displacement, a velocity, an acceleration, and a length of time an object is within a sensory field.

In one embodiment, an implementation of a touchless API in a computing device can allow a user to navigate and interact with a user Interface (UI) using touchless finger actions. For example, a user can select user components within a UI via touchless actions, such as finger movements within a sensory field of the touchless sensing device. The user can navigate and control user components within the UI by moving the finger to regions within the sensory field corresponding to user components. In another embodiment, a computer programmable medium can implement the touchless API to identify and track physical movement of an object.

Embodiments of the invention also concern a method for sensory event handling for use with a graphical user interface (GUI). The method can include the steps of registering a sensory event listener, and implementing a sensory event handler. The sensory event listener and sensory event handler can be components of a sensory API. The sensory event listener can identify a sensory event and report the sensory event to the sensory event handler.

In one embodiment, a sensory event can be a touchless finger press, a touchless finger release, a touchless finger hold, a touchless finger pause, a touchless finger text entry, a touchless finger text deletion, a finger touchless scroll, a touchless finger single click, or a touchless finger double click. The method of event handling can include providing a position, providing a relative displacement, providing a velocity, and providing an acceleration. A length of the glide, a starting point of the glide, an ending point of the glide, and a length of time of the glide can be exposed through the API. In addition the method can determine or adjust boundaries of a sensitivity field, determine or adjust a resolution of a sensitivity field, and determine or adjust a dimensionality of a sensitivity field.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term touchless sensing is defined as sensing movement without physically touching the object causing the movement. The term mounted is defined as a being attached to, connected to, part of, integrated within, associated with, coupled to, adjacent to, or near. The term cursor is defined as a cursor on a display and providing control to an underlying object. The cursor can be a handle to an object in the display, or a physical object remote from the display but visually controlled using the cursor on the display. The term cursor object is defined as an object that can receive coordinate information for positioning the object. The cursor can be a handle to the object, wherein the object can be controlled via the cursor.

In a first embodiment of the present disclosure, an Applications Programming Interface (API) suitable for providing touchless sensory information is provided. The API comprises a set of touchless API methods, wherein the set of touchless API methods conveys coordinates and movements of an object detected within a sensory field. The set of touchless API methods can include an API method for providing a position of the object, a displacement of the object, a velocity of the object, an acceleration of the object, and a time the object in the sensory field. The API can further comprise a user interface of a communication device, wherein the object is a user's finger and the communication device controls components within said user interface using touchless API methods implemented by the communication device. The user interface may be a graphical user interface, wherein the communication device controls graphical components within the GUI using touchless API methods implemented by the communication device. The communication device can be a touchscreen, a touchpad, a tablet, a mobile device, a headset, or a laptop that implements the API for touchless sensory interfacing.

In a second embodiment of the present disclosure, a computer-readable storage medium comprising computer instructions that implement a touchless applications programming interface (API) is provided. The storage medium can include computer instructions for providing at least one among a time, a position, a displacement, a velocity, an acceleration of a finger within a touchless sensory field of the communication device. The communication device can be a mobile device, a portable music player, a laptop, a personal digital assistant, or a cell phone.

In a third embodiment of the present disclosure a method, comprising a communication device for sensory event handling through a portable touchless API is provided. The method can include registering a sensory event listener, and implementing a sensory event handler. The sensory event listener can identify a sensory event and report the sensory event to the sensory event handler. The event handler can communicate at least one sensory event to a GUI application.

Figure 1:
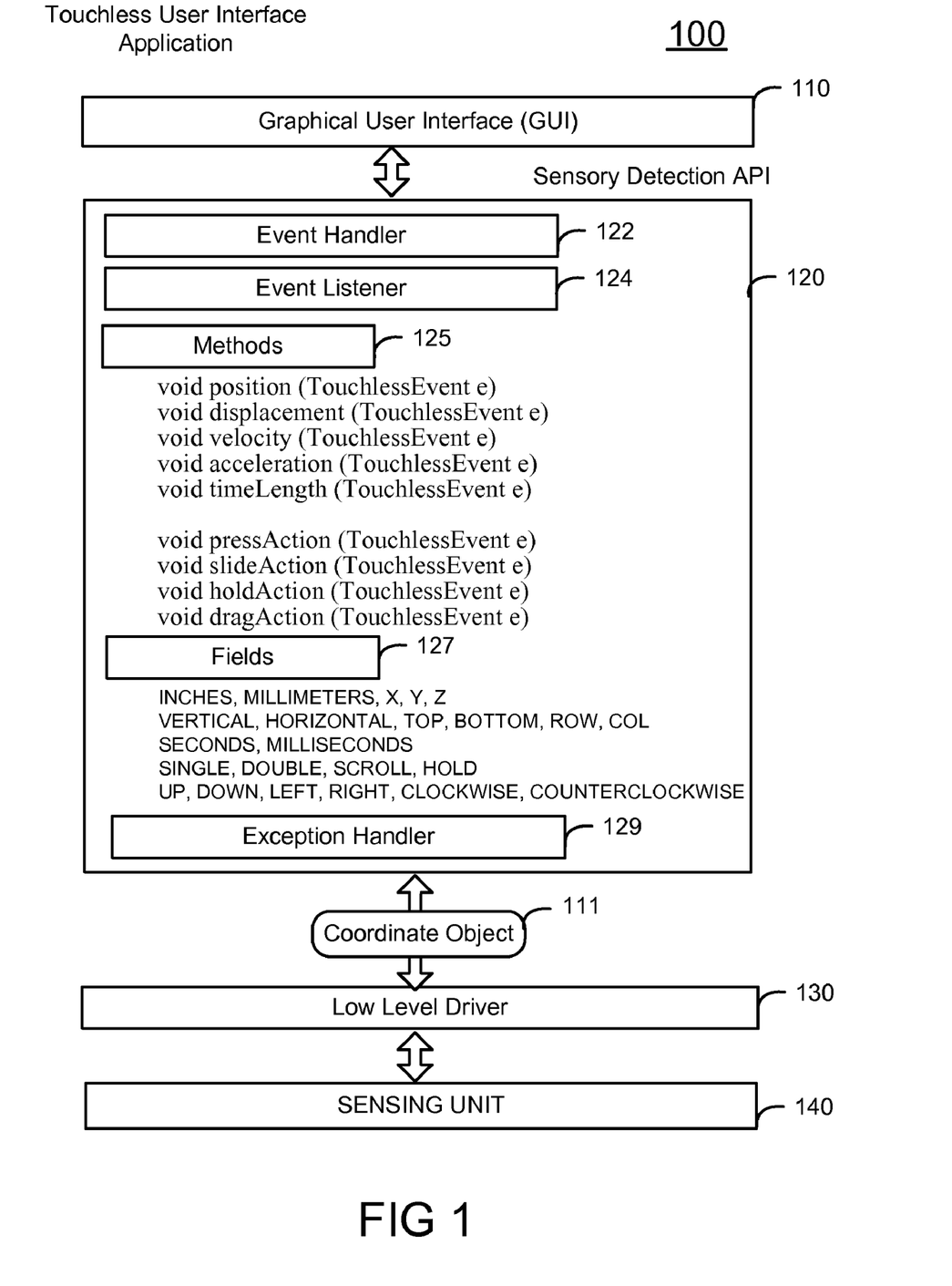
FIG. 1 illustrates a block diagram of an Applications Programming Interface (API) for providing touchless interaction with a User Interface (UI) in accordance with an embodiment of the inventive arrangements.

Referring to FIG. 1, a Touchless User Interface (TUI) application 100 is shown. As an example, the TUI application can be a control application which allows a user to interact with an underlying program or device via touchless finger movements and gestures. The TUI application can include a GUI 110, a touchless Applications Programming Interface (API) 120, a low level driver 130, and a sensing unit 140. The TUI is not limited to these components and may include fewer or more than the components shown. The sensing unit 140 can detect touchless sensory events and relay the sensory event through the low level driver 130 to the API 120. The low level driver 130 can package the object movement events into a coordinate object 111 which describes attributes of the object such as position, displacement, velocity, and acceleration. The coordinate object may also identify patterns in the finger movement such as up, down, left, right, clockwise rotation, and counterclockwise rotation, but is not limited to these. A sensory event can be any movement of an object within a sensory field of the sensing unit 140. In one particular example, an object movement can be a finger press, a finger release, a finger hold, or any other touchless finger action for interacting with the GUI 110. The API 120 can interpret the sensory events and translate the sensory events into a response action within the GUI 110. In practice, the GUI implements the sensory API 120 for receiving sensory events. The API 120 can include an event handler 122 for processing a sensory event and an event listener 124 for receiving a sensory event. The sensory event listener can identify a sensory event and report the event to the sensory event handler. The API 120 can also include an exception handler 129 to indicate and handle an unexpected sensory event.

In general, the touchless sensing unit 140 alone does not typically define how events are identified or handled. The touchless input unit 140 may provide a coordinate or an action, but does not generally reveal how the information is presented to a GUI application. Accordingly, a touchless sensing device in isolation has generally limited interface to a computer system or communication device. For example, a computer may not be aware that a device providing physical signals is an input device other than a mouse or keyboard. The low-level driver 130 can decide what finger behaviors constitute a single click action, or a scroll event, an up/down movement, a left/right movement, or the like. This provides a developer with programming options for incorporating a touchless sensing unit within applications when building a touchless user interface. The sensory API 120 describes how a user can interact with a touchless input device and how events are handled to mitigate this integration issue. The sensory API 120 in combination with the TUI 100 can allow developers to build touchless user interface applications that are portable across applications.

In practice, a developer can build a GUI application that is coupled to a sensing unit by implementing the sensory API 120. In one arrangement, the GUI 110 can be on a computer display and the sensing unit 140 can be remote from the display. In another arrangement, the sensing unit 140 may be part of the computer display or it may be separate from the computer display. For example, the sensing unit 140 can be a frame with an opening at least the size of the display and which fits around the screen allowing a user to see the display with unobstructed view. The sensing unit 140 may be intergrated and peripheral to the display. Notably, standard touch-screen frames contain a see-through or transparent film which the user touches to activate a GUI response. In comparison, physical touch actions are not required with the touchless sensing unit 140. In yet another arrangement, the sensing unit 140 can be placed next to the keyboard or a mouse. The user can position a finger within proximity of the sensing unit and gain control of a cursor object on the screen or gain navigation control of a GUI. In another aspect, the sensing unit can be a security monitor to determine the movement of objects within a sensory field of view. In another aspect, the sensing unit can be integrated with a mobile device, such as a cell phone, for providing touchless user interface control to the mobile device.

The API 120 exposes a set of touchless API methods 125 and touchless API fields 127 that are specific to touchless control actions. The methods 125 can be implemented by a program developer for creating a touchless user interface (TUI) application. The TUI can reside on a user interface of a cell phone offering user interface services provided by a service provider, back end management system, or mobile device manufacturer. Methods 125 can include position, displacement, velocity, acceleration, timeLength for interpreting coordinate information provided by the sensing unit 140. Methods 125 can also include pressAction, releaseAction, glideAction, holdAction, and dragAction, for identifying user action commands. Fields 127 can include inches, millimeters, for providing measures of object movement in X, Y, and Z principal axis directions, or polar units, or angular units. Fields 127 can also specify vertical, horizontal, top, bottom, left, and right for describing a movement of an object in a sensing field. Fields 127 can also identify a finger pattern recognized such as a left/right, up/down, clockwise or counter clockwise motion for controlling an user component. A row and column indication can also be accessed to determine if the object corresponds to a particular position in a grid layout. For example, the sensory space may correspond to GUI buttons on a display. As the object is moved, row and column indications can be provided to determine the corresponding GUI button. Fields 127 can include single click, double click, scroll, and hold to associate an action with a position. For example, row and column specify a position whereas single click specifies an action applied to said position. In one particular embodiment, a touchless sensing unit 140 can be used to detect and track finger movement for controlling a cursor object or navigating controls within a GUI.

In one particular example, a user can position a finger within a sensing field over the sensing unit 140 to interact with a GUI application. The sensory API 120 passes the coordinate object 111 up to the GUI 110 program application layer. The coordinate object may be an isolated packet in a stream connection or a plurality of packets in a communication with the underlying GUI system. At the physical layer, the sensing unit 140 can identify a location of the finger and produce a coordinate object 111 that represents the position of the finger in the sensory field of the sensing unit 140. The coordinate object 111 can also identify finger action motions such as gestures for performing a control operation in the GUI. In one arrangement, the sensory field is a volumetric region that projects outward from the sensing unit 140 encompassing a radius of approximately 12 inches. In another arrangement, the sensory field can be above the surface of a display, such as one created by capacitive based surface wave acoustics. The range of the sensing field can be further increased by increasing the gain of transmit transducers in the sensing unit 140. The sensory API 120 can reside on an application server providing the touchless service. For example, the sensing unit 140 may reside on a kiosk to detect numeric keypad entries through touchless finger movement. The Sensory API 120 may reside in the software that communicates the data to another entity such as a bank or financial institution. The GUI 110 may be the kiosk screen that provides feedback to the numeric entries the user. The sensory API 120 may also be on a back-end system such as a transaction processing system. The sensory API 120 may also be implemented by a communication device such as a cell phone, portable music player, headset, earpiece, or any other mobile device for providing touchless control to at least one function of the mobile device, or service provided by the mobile device.

Briefly, a GUI contains graphical components which a user can generally invoke through a mouse, keyboard, touchpad, or touchscreen. For example, an ATM banking teller display can present a GUI that allows a customer to access their bank account. In the current art, a user can depress graphical components on the screen to check the bank account, withdraw money, make deposits, and so on. A menu of buttons may be displayed showing the value of cash associated with each button. As an example, the customer can touch a menu button corresponding to the amount of cash they want to receive. As another example, a GUI application can be written for a touchscreen restaurant menu ordering system. A user can interact with the touchscreen by touching menu buttons corresponding to items of interest. The touchscreen GUI can identify the location of the finger using methods such as identifying the location of a change in capacitance within a mesh grid, or by increased current flow due to an increased conductance where the touchscreen film is depressed. Understandably, these events are physically driven by the physical action of the finger touching the touchscreen.

The sensory API of FIG. 1 is used for touchless interface applications and is portable across platforms. The sensory API reveals how sensory events are handled at the application layer. It also provides access to receiving sensory event information in a format common to the application programming language. In object oriented programming, underlying object resources are allocated to the event driven model when a sensory event is identified. A program that implements the sensory API 120 can receive events and process the events in view of the GUI application. For example, a developer of a touchscreen application implementing a touchscreen API can use event handling procedures that are transparently provided through the touchscreen API. Without an API, a developer is generally required to implement hard coded methods for interfacing the input device to the particular GUI application. Accordingly, a generic GUI application is tied to the input device and has limited access to underlying input device resources across disparate development platforms.

The sensory API 120 can be written in Java, C, or C++ or any other programming language. The sensory API 120 can include a set of methods and fields for inquiring coordinate information from the sensing unit. For example, a GUI developer may desire to know the position of an object such as a finger within the sensing field, or a direction of movement within the sensory field. In another example, the sensing unit 140 may be used to measure the displacement of an object such as an part of an automated robot system. The sensing unit 140 may be placed in an environment to measure the changes in the position or location of an object. For example, automotive equipment can include the sensing unit to check for part tolerances during manufacturing. Accordingly, the sensory API exposes methods which allow a GUI developer to acquire such information. Understandably, the GUI developer may want to know if the user is attempting to interact with a graphical component or to change the value of a graphical component. Alternatively, a GUI application that monitors the manufacture of a component can be informed as to changes in the location or size of the component. As another example, within the packaging industry, a size and location of packages can be determined. The sensory API exposes methods for providing a position, a relative displacement, a velocity, an acceleration, and a length of time an object is at a position or moves from a position. Method of the sensory API can provide a position, a relative displacement, a velocity and an acceleration. The methods can detect a grasping action, a pressing action, a glide action, a hold action, and a release action.

The sensing unit 140 allows a user to interact in a touchless manner with a GUI application for performing tasks such as web browsing, checking email, interacting with a button based GUI, interacting with a menu GUI system, interacting with a medical GUI system, interacting with a conference system, a bank account GUI, a restaurant order GUI, a credit card transaction, an authorization system, a security system, an audio player, a radio, or the like. For example, the sensing unit 140 can be a complementary input device for user interfacing, gaming, medical diagnostics, control interfacing, or conferencing. The sensory API 120 allows developers a means for coupling their GUI application with a touchless sensing unit, wherein the operations of the touchless sensing unit are proprietary, yet the sensing unit conveys control commands to the GUI in response to touchless events.

In one embodiment, the sensing unit 140 can be an array of ultrasonic transducers for determining a range of an object in the sensing field using time of flight measurements. The sensing unit 140 can also be an array of acoustic elements, microphones, camera elements, or light emitting diodes, or lasers, or infrared elements configured to identify and track the location of an object such as a finger. In one exemplary arrangement, for purposes of description only, the sensing unit 140 can employ ultrasonic sensing technology to capture coordinate information using time of flight measurements of ultrasonic signals. The coordinate information can be input to a computer or other device capable of controlling a cursor object to control or navigate the cursor object around the screen For example, a single transmit and receive element pair in the ultrasonic sensing unit 140 calculates a first range (e.g. distance) of an object in the field of view. Range measurements are calculated to determine a position of the finger within the sensing field. Determining the location of the finger over time allows for the tracking of movement. For example, a first transmit and receive pair on an x-axis estimate a longitudinal range. A second pair, arranged apart from the first pair, estimate a second range, or a latitudinal range. Accordingly, the two range measurements can establish a position (e.g. location) of the object causing the signal reflection. For example, the first range measurement establishes a x-coordinate and the second range measurement establishes a y-coordinate. The location of the object is then determined to correspond to the point (x,y) in a single plane. A third pair can produce a range measurement in a third direction thereby establishing a three-dimensional coordinate system (x,y,z) if the first, second, and third range measurement projections are orthogonal to one another.

In another arrangement, the sensing unit can be an array of camera elements identifying a location or movement of the object using changes in pixel intensity. As an example, the sensing unit can use an edge detector to identify one or more edges, and a peak detector for identifying pixels of high intensity. The sensing unit can track an intensity of the pixels in view of the edges for identifying a location and movement of the object. As another example, when optical elements are used, the sensing unit can evaluate changes in light intensity at various locations to track the location and movement of the object.

Notably, the sensing unit 140 can contain multiple sensing elements positioned and arranged in various configurations for receiving range measurements in varying directions for calculating the position of the object. The sensing unit 140 can also employ beamforming techniques for estimating the objects location. The sensing unit 140 can produce differential coordinate signals for satisfying the input signal requirements of a USB or BlueTooth input device connection interface. Notably, a computer mouse generally uses a USB or BlueTooth device driver for receiving differential signals for controlling interaction with a GUI. The sensing unit 140 can produce differential signals to be compliant with USB or BlueTooth device requirements. Consequently, emulation of the USB or BlueTooth interface is a hard coded approach in comparison to a more flexible open sensory API. The sensory API 120 facilitates the communication of coordinate data from a sensing device for coordinating navigational control information between the sensing unit 140 and the GUI 110.

The sensing device 140 can utilize computing technologies such as a microprocessor and/or digital signal processor (DSP) with associated storage memory such a Flash, ROM, RAM, SRAM, DRAM or other like technologies for controlling operations of the touchless API. For example, a computer-readable storage medium of the sensing unit 140 or a communication device can include computer instructions that implement the touchless applications programming interface (API) 120.

Referring back to FIG. 1, the low level driver 130 converts object movement signals provided by the sensing unit 140 to coordinate objects accessible to the sensory API 120. The coordinate objects can also identify movement patterns such as up/down, left/right, or clockwise and counterclockwise finger movements. The sensory API 120 can encapsulate the coordinate object 111 and make it available to the GUI 110 in a portable non-proprietary format. The GUI 110 can access the object movement information from the underlying coordinate object 111 thereby providing navigation and control capabilities of an application exposing the GUI 110 or control signals for interfacing with a computer system or mobile device. The coordinate object 111 can be a C class, a C++ class, a Java Class, a .NET class, a VB class, or any other object oriented data structure. The coordinate object 111 can be accessed via a method call or a function call to pass communications back and forth between the sensory API 120 and the GUI 110. The coordinate object 111 is not limited to only passing coordinate information. The coordinate object 111 can be a common messaging object between the sensing unit 140 and the sensory API for optimizing performance, or for integrating with other external devices.

The coordinate object 111 can include a Cartesian coordinate representation, a polar representation having a magnitude and phase, or a vector representation having an angle and a length. The coordinate object 111 can also describe the displacement, velocity, or acceleration of the detected object. For example, a location of the finger at a first time can be calculated at a position (x1,y1,z1) and a location of the finger at a second time can be calculated at a second position (x2, y2,z1). The sensing unit 140 can detect the location and movement of a finger when the finger is within a sensory field of the sensing unit 140. For example, an ultrasonic sensing unit can have a sensory field wherein the emitting of a pulse that reflects off a finger within the sensory field is sufficiently strong enough to trigger a detection by an ultrasonic detector transducer.

The boundaries of the sensing field describe the bounds to which movement and location of an object can be detected. Similarly, an array of sensors may be placed in an arrangement which broadens the sensory field. The sensory API can provide a method for determining or adjusting the boundaries of the sensitivity field, a method for determining or adjusting a resolution of the sensitivity field, and a method for determining or adjusting a dimensionality of the sensitivity field. For example, the boundary can be a map of a volume of the sensitivity field, or a map of an area of the sensitivity field. The map can be represented by a set of grid points within a two dimensional space or a three dimensional space.

A velocity vector representing distance over time can be calculated as the change (derivative) of the position over the change in time (velocity=dPosition/dTime). Similarly, an acceleration vector can be calculated as the change in velocity over the change in time (acceleration=dvelocity/dtime). The notations for the location and movement can be represented in polar or angular coordinates for simplifying vector additions and subtractions. The low-level driver 130 effectively converts raw coordinate data provided by the sensing unit 140 into a data type or format accessible to the sensory API 120. Moreover, the low-level driver 130 can convert proprietary data formats into conventional native method calls or variable values that can be exposed by the Sensory API 120. The low-level driver 130 can be written in machine language, assembly, C, C++, Java, or any other language and define base classes that include methods 125 and fields 127 to expose the coordinate and control data produced by the sensing unit 140. In certain cases, the low-level driver 130 can be implemented as an analog chip, or as an Application Specific Integrated Circuit (ASIC) which creates physical circuit level transistor gates for performing the logic and computations. The low-level driver 130 can be imaged from a VLSI digital design or analog design. Also, the low-level driver 130 can be a USB device driver or BlueTooth driver to translate device signals to classes and methods. The low-level driver precipitates coordinate and control data to the sensory API 120 which then exposes methods for accessing the abstract coordinate and touchless control information. The GUI 110 implements the sensory API 140 and is effectively hidden from the underlying implementation details. The sensory API 140 provides a level of insulation that hides the underlying complexities and makes application development more portable.

The low-level driver 130 requests and carries out lower-level services performed by the sensing unit 140. For example, the low-level driver 130 converts signals received by the sensing unit into data formats recognizable by the API 140. The low-level driver 130 and touchless APU 140 can be written in at least one program language such as C, C++, .NET, Visual Basic, and Java. For example, the low-level driver can be written in C and encapsulated as a Java Native Interface (JNI) method. The sensory API can be written in Java and access the underlying low-level driver functions through JNI method calls. Similarly, the sensory API can be written in C++ or .NET and can access underlying function calls from the low-level driver 130. The sensory API can access sensory events in a manner similar to a Windows Touchpad Driver API, Windows Tablet Driver API, Windows Mouse Driver API, Windows Keyboard API, or the like.

The sensory API 120 can include an event handler and event listener. The sensory event listener can be registered and the sensory event handler can be implemented to process a graphical user interface event. For example, a developer of a touchless user interface registers a sensory event listener and implements an event handler. When the low-level driver 130 receives a sensory event, the event listener identifies the requested action and the event handler applies the action to the GUI. In effect a sensory event is directly communicated to the GUI through the API. An event listener listens for specific types sensory events generated by objects in a program. For example, an event listener will listen for changes in the coordinate object from the sensing unit 140 which generally occurs as a result of a change of finger movement. The sensory API can identify the sensory events and report the information to the GUI which can process the information accordingly. For example, a set of methods within the API provide a position of the finger, a relative displacement of the finger, a velocity of the finger, an acceleration of the finger, and the length of time the finger is at a location. The API also detects a finger depression action, a finger glide action, a finger hold action, and a finger release action. The API also determines the boundaries of a sensitivity field, a resolution of a sensitivity field, and an order of said sensitivity field. The API is not limited to these methods and can include other methods for providing object movement information. In addition, extensions of the provided methods and combinations of the methods for providing more sophisticated logic are contemplated within the scope of the invention.

Figure 2:
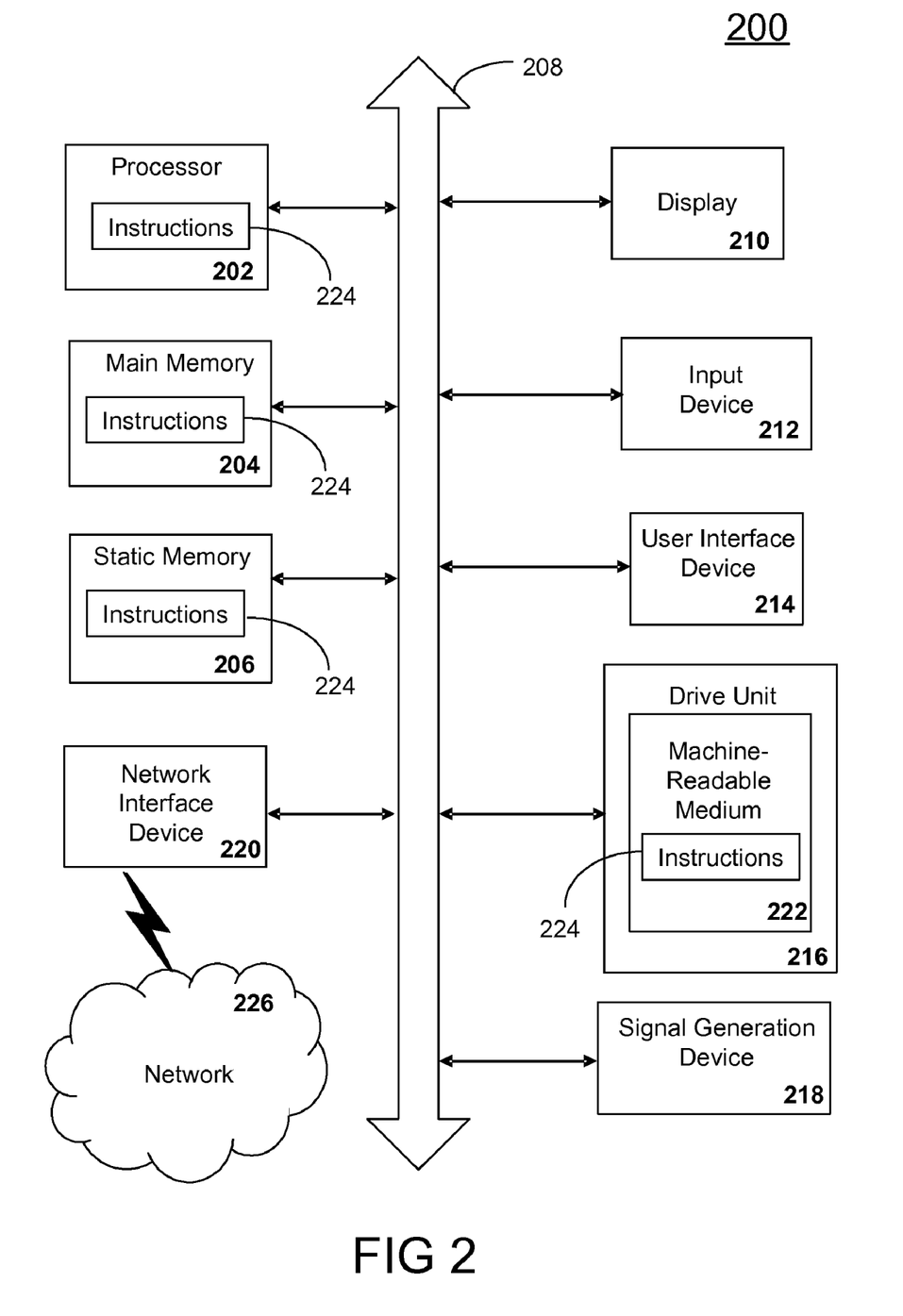
FIG. 2 depicts an exemplary diagrammatic representation of a machine in the form of a communication device within which a set of instructions, when executed, may cause the machine to perform any one or more of the methodologies disclosed herein.

FIG. 2 depicts an exemplary diagrammatic representation of a machine in the form of a communication device 200 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a mobile device, headset, control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 200 may include a processor 202 (e.g., a central processing unit (CPU), a graphics processing unit (GPU, or both), a main memory 204 and a static memory 206, which communicate with each other via a bus 208. The computer system 200 may further include a video display unit 210 (e.g., a liquid crystal display (LCD), a flat panel, a solid state display, or a cathode ray tube (CRT)). The computer system 200 may include an input device 212 (e.g., sensing unit), a cursor control device 214 (e.g., a mouse), a disk drive unit 216, a signal generation device 218 (e.g., a speaker or remote control) and a network interface device 220. The sensing unit can include sensory elements such as ultrasonic sensors, CCD imaging elements, camera elements, infrared elements, and optical elements.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor 202 during execution thereof by the computer system 200. The main memory 204 and the processor 202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An Applications Programming Interface (API), executing from a computer system suitable for use in providing sensory information comprising:
    a set of programmable touchless API methods wherein the set of programmable touchless API methods expose sensory information related to an object within a three-dimensional sensory space for rendering onto a Graphical User Interface (GUI), and
    a low-level driver on the computer system configured to communicate over a wireless communication link to an ultrasonic sensing unit providing the sensory information,
    wherein the ultrasonic sensing unit:
        stores digital ultrasonic reflection wave in a local memory of the ultrasonic sensing unit, and,
        generates a history of sensory information consisting of Time of Flights (TOFs) and phase differentials calculated from the stored digital ultrasonic reflection wave including an absolute location and relative movement of the object with respect to an origin of a three-dimensional coordinate system defining the touchless sensory space,
    wherein the ultrasonic sensing unit contains an on-board digital signal processor (DSP), the local memory and battery to perform pulse-echo location of the object by way of a transmitter and three or more receivers wherein a transmitter receiver pair provides one-dimensional range measurement, establish the three-dimensional coordinate system with X, Y and Z principal axes, and
    wherein the low-level driver receives the history of sensory information for each transmitter and receiver pair from the local memory by the DSP performing precise tracking and angular resolution of the object along range measurement projections of the X, Y and Z principal axes in the three-dimensional coordinate system.

2. The API of claim 1, wherein said set of touchless API methods comprises at least one among an touchless API method for providing a position of the object, a displacement of the object, a velocity of the object, an acceleration of the object, and a time the object is in the sensory space
    whereby a symmetric arrangement of sensors produces a parabolic intersection point from first, second and third complex surfaces for respective first, second and third range measurements of the transmitter receiver pairs.

3. The API of claim 1, further comprising a user interface of the computer system, wherein said object is a user's finger and the computer system controls components within said user interface using touchless API methods implemented by the computer system.

4. The API of claim 3, wherein said object is a user's finger and the computer system controls graphical components within said GUI using touchless API methods implemented by the computer system.

5. The API of claim 1, wherein the computer system further comprises a touchscreen, a touchpad, a tablet, a mobile device or a laptop that implements said API for permitting a developer to program and build touchless sensory interfacing applications thereon.

6. The API of claim 1, wherein a movement is identified as at least one among an up motion, down motion, left motion, right motion, clockwise pattern, or counter clockwise pattern.

7. The API of claim 1, wherein said set of touchless API methods comprises at least one among a touchless API method for detecting a three-dimensional pause action, a pressing action, a glide action, a hold action, and a release action of a finger within the sensory space.

8. The API of claim 7, wherein said touchless API method of detecting said pressing action returns at least one of:
    a location of said pressing action;
    a depth of said pressing action; and
    a length of time of said pressing action.

9. The API of claim 7, wherein said touchless API method of detecting said glide action returns at least one of:
    a length of said glide;
    a starting point of said glide;
    an ending point of said glide; and
    a length of time of said glide.

10. The API of claim 1, wherein said set of touchless API methods comprises at least one among an API method for determining:
    a boundary of the sensory space;
    a resolution of the sensory space; and
    a dimensionality of the sensory space.

11. The API of claim 1, further comprising:
    an event listener for receiving at least one sensory event from the ultrasonic sensing unit; and
    an event handler for processing said sensory event.

12. The API of claim 1, wherein the low-level driver converts the history received from the sensing unit into a coordinate object responsive to the ultrasonic sensing unit tracking the previously received stored digital reflected ultrasonic waves by weighting the TOFs with the phase differentials,
    wherein said low-level driver comprises computer instructions in a computer-readable storage medium of a communication device.

13. A computer-readable storage medium, comprising computer instructions that implement a touchless applications programming interface (API) comprising a set of programmable touchless API methods and touchless API fields
    wherein the set of programmable touchless API methods programmatically manipulate sensory information related to an object within a three-dimensional sensory space for building a Graphical User Interface (GUI), and
    a low-level driver on the computer system configured to:
        communicate over a wireless communication link to an ultrasonic sensing unit providing the sensory information,
    wherein the ultrasonic sensing unit:
        calculates phase differentials between previously received reflected stored ultrasonic wave in a local memory of the ultrasonic sensing unit, tracks a history of Time of Flights weighted by phase differentials for predicting an error estimate to produce a fine location of the object; and, generates sensory information from the tracking of the Time of Flights (TOFs) and phase differentials in the history for each transmitter-receiver pair on the ultrasonic sensing unit, wherein the low-level driver generates an absolute location and relative movement of the object with respect to an origin of a three-dimensional coordinate system defining the touchless sensory space from the sensory information, wherein the ultrasonic sensing unit contains an on-board digital signal processor (DSP), the local memory, ultrasonic sensors and power supply to perform pulse-echo location of the object by way of ultrasonic sensors comprising a transmitter and three or more receivers, establish the three-dimensional coordinate system with respect to a approximately symmetric arrangement of the sensors located thereon to create X, Y and Z principal axes of the three-dimensional coordinate system, and store and reference received ultrasonic wave in the local memory for performing millimeter accuracy tracking and angular resolution of the object along range measurement projections of the X, Y and Z principal axes in the three-dimensional coordinate system.

14. The storage medium of claim 13, comprising computer instructions for providing at least one among a time, a position, a displacement, a velocity, an acceleration of a finger within a touchless sensory space of a computer system.

15. The storage medium of claim 14, wherein the storage medium resides in at least one among a computer, a mobile device, a portable music player, a laptop, a personal digital assistant, and a cell phone.

16. The API of claim 13 provides sensory event handling by:

registering a sensory event listener enumerated by the ultrasonic sensing unit; and implementing a sensory event handler in the GUI specific to the enumeration, wherein said sensory event listener identifies a sensory event and reports said sensory event to said sensory event handler.

17. The method of claim 13, further comprising providing at least one among a finger position, a finger relative displacement, a finger velocity, and a finger acceleration.

18. The method of claim 17, further comprising detecting at least one among a pause action, a depression action, a glide action, a hold action, and a release action.

* * * * *